United States Patent
Kaladgi et al.

(10) Patent No.: US 10,354,060 B2
(45) Date of Patent: Jul. 16, 2019

(54) APPLYING A PARTIAL CAPTCHA

(71) Applicant: CA, Inc., New York, NY (US)

(72) Inventors: Mohammed Mujeeb Kaladgi, Bangalore (IN); Jameel Ahmed Kaladgi, Bangalore (IN)

(73) Assignee: CA, Inc., New York, NY (US)

( * ) Notice: Subject to any disclaimer, the term of this patent is extended or adjusted under 35 U.S.C. 154(b) by 405 days.

(21) Appl. No.: 14/844,682

(22) Filed: Sep. 3, 2015

(65) Prior Publication Data
US 2017/0068808 A1 Mar. 9, 2017

(51) Int. Cl.
*G06F 21/00* (2013.01)
*G06F 21/36* (2013.01)
*G06F 17/30* (2006.01)
*H04L 29/06* (2006.01)

(52) U.S. Cl.
CPC .......... *G06F 21/36* (2013.01); *H04L 63/1441* (2013.01); *G06F 2221/2133* (2013.01); *H04L 63/083* (2013.01)

(58) Field of Classification Search
CPC ............. G06F 21/36; G06F 2221/2133; H04L 63/1441; H04L 63/083; H04L 63/08
See application file for complete search history.

(56) References Cited

U.S. PATENT DOCUMENTS

| | | | |
|---|---|---|---|
| 6,195,698 B1 | 2/2001 | Lillibridge et al. | |
| 2007/0250920 A1* | 10/2007 | Lindsay | G06F 21/31 726/7 |
| 2007/0294637 A1* | 12/2007 | Renaud | G06F 3/0482 715/814 |
| 2009/0113294 A1* | 4/2009 | Sanghavi | G06F 17/211 715/269 |
| 2010/0251388 A1* | 9/2010 | Dorfman | G06F 21/36 726/29 |
| 2011/0295740 A1* | 12/2011 | Blackwell | G06Q 20/10 705/39 |
| 2012/0291122 A1* | 11/2012 | Chow | G06F 21/36 726/19 |
| 2015/0269387 A1* | 9/2015 | Cannarsa | G06F 21/62 726/30 |
| 2015/0365401 A1* | 12/2015 | Brown | H04L 63/0838 726/7 |
| 2017/0061114 A1* | 3/2017 | Kalra | G06F 21/6218 |
| 2017/0061115 A1* | 3/2017 | Kalra | G06F 21/36 |

* cited by examiner

*Primary Examiner* — Mohammad A Siddiqi
(74) *Attorney, Agent, or Firm* — Baker Botts L.L.P.

(57) ABSTRACT

A method for receiving a first access request from a client computer is described. The method comprises, in response to receiving the first access request, generating a query string comprising a predetermined number of characters, designating, via a unique indicator, a first randomized subset of the predetermined number of characters, wherein the first randomized subset comprises a plurality of the predetermined number of characters, and requesting a first predefined response comprising the first randomized subset of the predetermined number of characters. The method further comprises receiving a first client input from the client computer, determining whether the first client input matches the first predefined response, and accepting the first access request if the first client input matches the first predefined response.

20 Claims, 5 Drawing Sheets coffee matrix

FIG.1 coffee matrix

☐ Enter the 3rd letter

☐ Enter the 5th letter

☐ Enter the 8th letter

☐ Enter the 9th letter

☐ Enter the 12th letter

FIG. 3

APPLYING A PARTIAL CAPTCHA

BACKGROUND

The present disclosure relates to interfaces and, in particular, to a system, a computer program product, and method for determining whether an access request is made by a human.

SUMMARY

According to an embodiment of the present disclosure, a method is disclosed comprising receiving a first access request from a client computer. The method further comprising, in response to receiving the first access request, generating a query string comprising a predetermined number of characters, designating, via a unique indicator, a first randomized subset of the predetermined number of characters, wherein the first randomized subset comprises a plurality of the predetermined number of characters, and requesting a first predefined response comprising the first randomized subset of the predetermined number of characters. The method further comprising receiving a first client input from the client computer, determining whether the first client input matches the first predefined response, and accepting the first access request if the first client input matches the first predefined response.

According to another embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-6, like numerals being used for corresponding parts in the various drawings.

FIG. 1 illustrates a query string of a non-limiting embodiment of the present disclosure.

FIG. 3 illustrates a query string with additional response areas of a non-limiting embodiment of the present disclosure.

DETAILED DESCRIPTION

Figure 2:
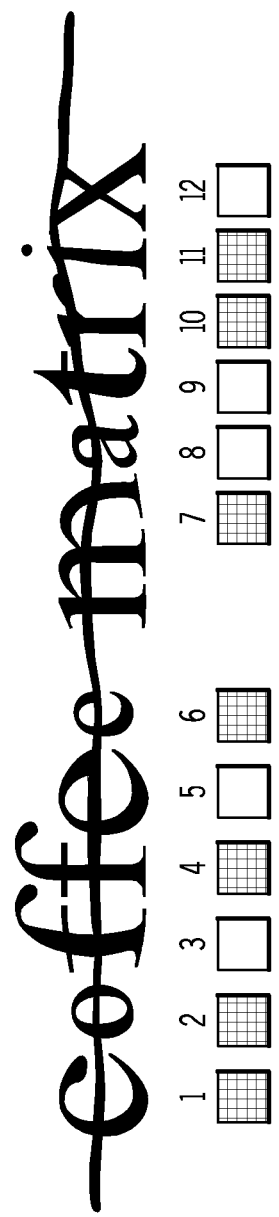
FIG. 2 illustrates a query string and response areas of a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A Completely Automated Public Turing test to tell Computers and Humans Apart ("Captcha") is a type of challenge-response test used in computing to determine whether or not a user is human. In other words, a captcha is a program or system intended to distinguish between human and machine input. Captchas are often used as a way of thwarting spam and automated extraction of data from websites.

With the rise of the internet, malicious users have created automated processes, such as, for example, bots, that attempt to access services intended to be limited to human users. These processes include accessing databases, registering email accounts, downloading programs, and entering passwords. Captchas stonewall these bots by challenging the user to respond to a test meant for only humans to complete.

However, the present captcha systems do not go beyond simple word distortion. The common type of captcha requires that the user type the letter of a distorted image, sometimes with the addition of an obscured sequence of letters or digits that appear on the screen. One of the key challenges in captcha design today is the level of difficulty of the test. Any complicated design that attempts to thwart character recognition software will also be difficult for humans to read. These systems often frustrate the user and can lock out a valid human user from appropriate databases.

Captcha requests protect websites from unauthorized bots. However, standard captcha requests can be easily broken with different attack techniques. Malicious bots with Optional Character Recognition (OCR) abilities can break through captcha protections. Additionally, a malicious user may use dictionary attacks to solve a captcha. A captcha dictionary is a record of all captcha images with which a server can challenge the user. Moreover, captcha farms comprise many employees continuously solving captchas and storing solutions in a database for later use by a malicious bot. Captcha image matching may be completed by reverse image searching. Because standard captchas may be easy to crack, captchas have grown in length and complexity. These convoluted captchas are difficult and inconvenient for a human user to solve.

Accordingly, there is a need in the marketplace for a client-friendly captcha system designed to improve usability and weed out automated malicious systems. The present disclosure provides a solution to overcome the weaknesses of traditional captcha protections. The present disclosure describes a captcha system that increases complexity of the captcha without increasing difficulty for a human user to complete. Embodiments of the present disclosure can address the above problems, and other problems, individually and collectively.

FIG. 1 illustrates a query string of a non-limiting embodiment of the present disclosure. A user may be presented with this captcha image and asked to solve it. The correct answer for this captcha is 'coffee matrix.' If a user enters the correct answer, he may be granted access to a database, account, service, etc. If a user enters an incorrect answer he will not be allowed access.

To take advantage of captchas of this style, companies have run a bot that captures the captcha image in FIG. 1 and stores it in a database. The bot's backend system may use servers to then use OCR to determine the right answer for this captcha. The bot may try answers such as 'coffee malix' or 'coffee matiix,' but these answers will be denied access. The bot may continue a brute force attack until it finds the correct answer. Upon gaining access, the bot will store the captcha image and the corresponding correct answer in a database. If the bot is subsequently challenged with the same captcha, it can access the corresponding correct answer in its database, essentially nullifying the captcha verification step.

The present disclosure overcomes this problem by using a variety of effective techniques. FIG. 2 illustrates a query string and response areas of a non-limiting embodiment of the present disclosure. In the present disclosure, a user may be presented with a captcha image and a request to enter a randomized subset of characters of the captcha image. Characters are not limited to text or numbers, but may also be images, characters, etc. In FIG. 2, the user may be requested to enter the 3rd, 5th, 8th, 9th, and 12th characters. In this non-limiting embodiment, the correct access response is 'featx.' By requesting a subset of the captcha characters, a bot cannot gain access to the system by brute force attacks. The requested subset of characters of the captcha image may be selected at random, providing for a significant amount of different captcha challenges for each captcha image. Moreover, the present disclosure may determine a response time of a user to determine whether the response time indicates a human response.

Additionally, since the user is only challenged for a subset of characters, these captcha images may be of significantly longer length without further burdening the user. Longer captchas also frustrate the bots that use an OCR attack because there are more characters to decode. Furthermore, this technique prevents dictionary attacks because offline captcha decoders solve all the characters and are unable to predict which randomized set of characters will be selected for a challenge.

FIG. 3 is a query string with additional response areas of a non-limiting embodiment of the present disclosure. FIG. 3 depicts a possible embodiment similar to the captcha challenge in FIG. 2. In FIG. 3, the user may be challenged to enter a randomized subset of characters of the captcha image. Here the user may be requested to enter the 3rd, 5th, 8th, 9th, and 12th character of the captcha image. In this non-limiting embodiment, the correct access response is 'featx.' The requested subset of characters of the captcha image may be selected at random, providing for a significant amount of different captcha challenges for each captcha image.

Figure 4:
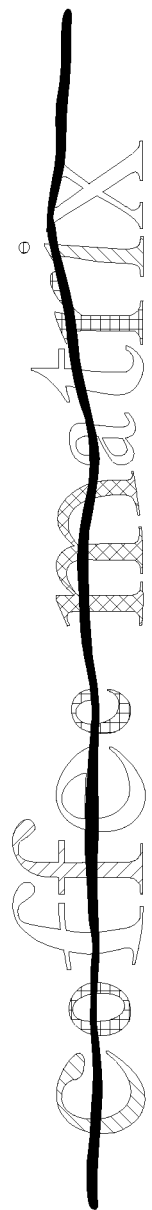
FIG. 4 illustrates a color coded query string of a non-limiting embodiment of the present disclosure.

FIG. 4 illustrates a color coded query string of a non-limiting embodiment of the present disclosure. In this non-limiting embodiment, the user is challenged to enter a randomized subset of characters of the captcha image. However, in this non-limiting embodiment, the user may be challenged to enter only those characters of a specific color. In this non-limiting embodiment of the present disclosure, color may be considered a unique indicator of which characters the user should include in a response. Other unique indicators include selected markings, animations, etc.

In FIG. 4, the user may be challenged to enter only the yellow characters of the captcha image. In this non-limiting embodiment, the correct access response is 'oer.' This added dynamism in the captcha increases the complexity of the protection without further burdening the user. The requested subset of characters of the captcha image may be color coded at random, providing for a significant amount of different captcha challenges for each captcha image. For example, three colors may be randomly chosen from an easily distinguishable set of colors like violet, blue, green, yellow, orange, red, black, white, etc. All characters of the captcha may be overlaid with one of the three colors using simple image processing techniques. The user is then asked to enter the characters of a specific color, as shown in FIG. 4. In addition, the characters may be overlaid with several shades of each color. Using this technique, a captcha challenge may consist of a substantial number of characters without further burdening the user. In other words, because the user is challenged for only a subset of characters, the captcha may consist of a large number of characters.

The color coding technique provides at least two distinct advantages over traditional captcha requests. First, this technique provided dynamism in the random selection of characters to challenge within the captcha plurality of characters. Second, this technique provides dynamism in the random selection of colors that are used to paint the characters of the captcha protection. Both of these advantages prevent a bot from successful decoding the captcha.

Figure 5:
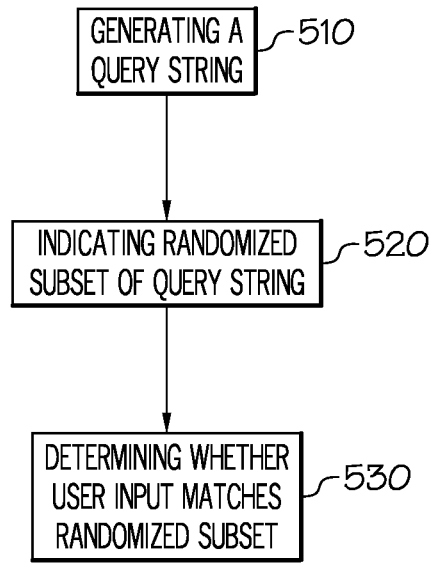
FIG. 5 illustrates a flow diagram depicting the process of determining whether a user is human in a non-limiting embodiment of the present disclosure.

FIG. 5 illustrates a flow diagram depicting the process of determining whether a user is human in a non-limiting embodiment of the present disclosure. In step 510, the captcha system may generate a query string in response to receiving an access request form a user. The query string may comprise a predetermined number of characters.

In step 520, the captcha system may indicate a randomized subset of the predetermined number of characters. This indication may occur via response box requests indicating specific characters of the predetermined number of characters. In addition, the indication may occur via a color coding of the predetermined number of characters. Furthermore, the indication may comprise a combination of any such indicators. Furthermore, the captcha system may request from the user a predefined response comprising the randomized subset of the predetermined number of characters.

In step 530, the captcha system may receive a user input and determine whether the input matches the predefined response. If the input matches the response, the user's access request may be granted. If the input fails to match the predefined response, the access request will be denied.

Figure 6:
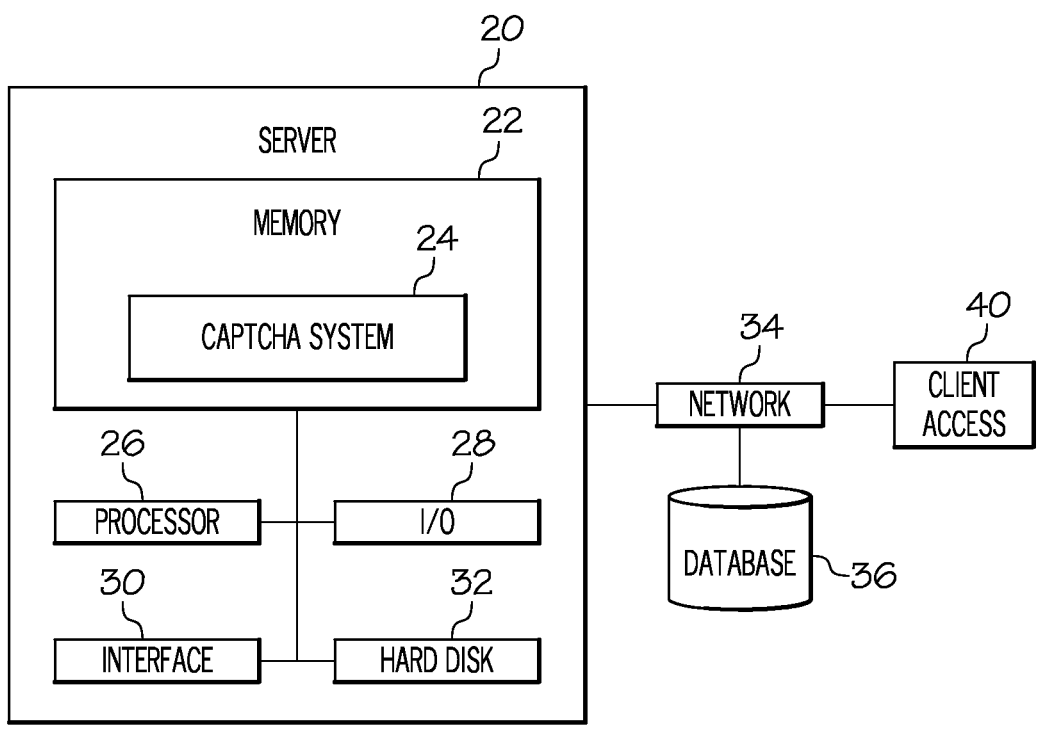
FIG. 6 illustrates a captcha system domain model in a non-limiting embodiment of the present disclosure.

FIG. 6 illustrates a captcha system domain model in a non-limiting embodiment of the present disclosure. The captcha system ecosystem may include a server 20, a memory 22, a captcha system 24, a processor 26, an interface 30, an input and output ("I/O") device 28, and a hard disk 32. Captcha system 24 analysis may take place on the server 20 shown in FIG. 6. Processor 26 may be operable to load instructions from hard disk 32 into memory 22 and execute those instructions. Memory 22 may store computer-readable instructions that may instruct the server 20 to perform certain processes. I/O device 28 may receive one or more of data from another server or a network 34. The server 20 may be considered a processing system. Furthermore, captcha system 24 analysis may take place on any processing system, wherein the processing system comprises one or more processors.

Network 34 may comprise one or more entities, which may be public, private, or community based. Network 34 may permit the exchange of information and services among users/entities that are connected to such network 34. In certain configurations, network 34 may be a local area network, such as an intranet. Further, network 34 may be a closed, private network/cloud, in certain configurations, and an open network/cloud in other configurations. Network 34 may facilitate wired or wireless communications of information and provisioning of services among users that are connected to network 34.

The captcha system ecosystem may also include a database 36 which may include, for example, additional servers and resources. The captcha system 24 may receive additional captcha challenges or images from database 36. The captcha system 24 may also store system performance and any information regarding the captcha system.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method comprising:
receiving a first access request from a client computer;
in response to receiving the first access request:
generating an image comprising a predetermined number of characters;
transmitting the image to the client computer for display to a user;
designating, via a unique indicator, a first subset of the predetermined number of characters of the image, wherein the first subset comprises a plurality of the predetermined number of characters and wherein a second subset of the predetermined number of characters of the image are not designated via the unique identifier, the second subset being different than the first subset;
requesting from the user a first predefined response comprising the first subset of the predetermined number of characters and excluding the second subset of the predetermined number of characters;
wherein the first predefined response comprises fewer than all of the predetermined number of characters, includes particular ones of the predetermined number of characters and excludes all of the predetermined number of characters other than the particular ones;
receiving a first client input from the client computer;
determining whether the first client input matches the first predefined response; and
accepting the first access request if the first client input matches the first predefined response.

2. The method of claim 1, wherein designating, via the unique indicator, the first subset of the predetermined number of characters further comprises:
color coding, via the unique indicator, the first subset with a selected color, and
wherein requesting the first predefined response comprises requesting that the user input only ones of the predetermined number of characters that are color coded with the selected color.

3. The method of claim 2, wherein a remaining portion of the predetermined number of characters are color coded in a plurality of colors differing from the selected color.

4. The method of claim 1, wherein designating, via the unique indicator, the first subset of the predetermined number of characters further comprises:
formatting for display, via the unique identifier, response areas for the first subset of the predetermined number of characters in a graphical user interface.

5. The method of claim 1, further comprising:
receiving a second access request from the client computer;
in response to receiving a second access request from the client computer:
generating the query string comprising the predetermined number of characters;
designating, via the unique indicator, a second subset of the predetermined number of characters, wherein the second subset differs from the first subset;
requesting a second predefined response of the randomized subset of the predetermined number of characters;
receiving a second client input from the client computer; and
accepting the second access request if the second client input matches the second predefined response.

6. The method of claim 1, wherein the image represents a CAPTCHA image and wherein the subset of the predetermined number of characters comprise randomly selected ones of the predetermined number of characters, and wherein requesting the first predefined response comprises requesting that the user input only the randomly selected ones of the predetermined number of characters.

7. The method of claim 1, wherein designating, via the unique indicator, the first subset of the predetermined number of characters further comprises:
identifying, via the unique indicator, the first subset with a selected marking.

8. The method of claim 1, further comprising:
determining a response time of the first client input; and
determining whether the response time indicates a human response.

9. The method of claim 1, wherein designating, via the unique indicator, the first randomized subset of the predetermined number of characters further comprises:
identifying, via the unique indicator, the first randomized subset by numbering a position of the plurality of characters within the predetermined number of characters.

10. The method of claim 1, wherein the predetermined number of characters appear in an order in the image and wherein requesting the first predefined response comprises requesting that the user enter only particular ones of the predetermined number of characters that appear in particular positions within the order and fewer than all of the predetermined number of characters.

11. A system comprising:
a processing system configured to perform processes comprising:
receiving a first access request from a client computer;
in response to receiving the first access request:

generating a query string comprising a predetermined number of characters;

designating, via a unique indicator, a first randomized subset of the predetermined number of characters, wherein the first randomized subset comprises a plurality of the predetermined number of characters, and wherein a second subset of the plurality of the predetermined number of characters is not designated via the unique indicator;

requesting a first predefined response comprising the first randomized subset of the predetermined number of characters;

receiving a first client input from the client computer;

determining whether the first client input matches the first predefined response; and accepting the first access request if the first client input matches the first predefined response.

12. The system of claim 11, wherein designating, via the unique indicator, the first randomized subset of the predetermined number of characters further comprises:

color coding, via the unique indicator, the first randomized subset with a selected color.

13. The system of claim 12, wherein a remaining portion of the predetermined number of characters are color coded in a plurality of colors differing from the selected color.

14. The system of claim 12, wherein the selected color is depicted in a plurality of shades.

15. The system of claim 11, wherein designating, via the unique indicator, the first randomized subset of the predetermined number of characters further comprises:

formatting for display, via the unique identifier, response areas for the first randomized subset of the predetermined number of characters in a graphical user interface.

16. The system of claim 11, further comprising:

receiving a second access request from the client computer;

in response to receiving a second access request from the client computer:

generating the query string comprising the predetermined number of characters;

designating, via the unique indicator, a second randomized subset of the predetermined number of characters, wherein the second randomized subset differs from the first randomized subset;

requesting a second predefined response of the second randomized subset of the predetermined number of characters;

receiving a second client input from the client computer; and accepting the second access request if the second client input matches the second predefined response.

17. The system of claim 11, wherein predetermined number of characters represents a CAPTCHA image.

18. The system of claim 11, further comprising:

determining a response time of the first client input; and determining whether the response time indicates a human response.

19. The system of claim 11, wherein designating, via the unique indicator, the first randomized subset of the predetermined number of characters further comprises:

identifying, via the unique indicator, the first randomized subset by numbering a position of the plurality of characters within the predetermined number of characters.

20. A computer program product comprising:

a non-transitory computer-readable storage medium having computer-readable program code embodied therewith, the computer-readable program code comprising:

computer-readable program code configured to receiving a first access request from a client computer;

in response to receiving the first access request:

computer-readable program code configured to generate a query string comprising a predetermined number of characters;

computer-readable program code configured to designate, via a unique indicator, a first randomized subset of the predetermined number of characters, wherein the first randomized subset comprises a plurality of the predetermined number of characters, and wherein a second subset of the plurality of the predetermined number of characters is not designated via the unique indicator;

computer-readable program code configured to request a first predefined response comprising the first randomized subset of the predetermined number of characters;

computer-readable program code configured to receive a first client input from the client computer;

computer-readable program code configured to determine whether the first client input matches the first predefined response; and computer-readable program code configured to accept the first access request if the first client input matches the first predefined response.

* * * * *